N. B. WALES.
REFRIGERATING APPARATUS.
APPLICATION FILED APR. 20, 1917.
1,325,868.
Patented Dec. 23, 1919.
2 SHEETS—SHEET 1.
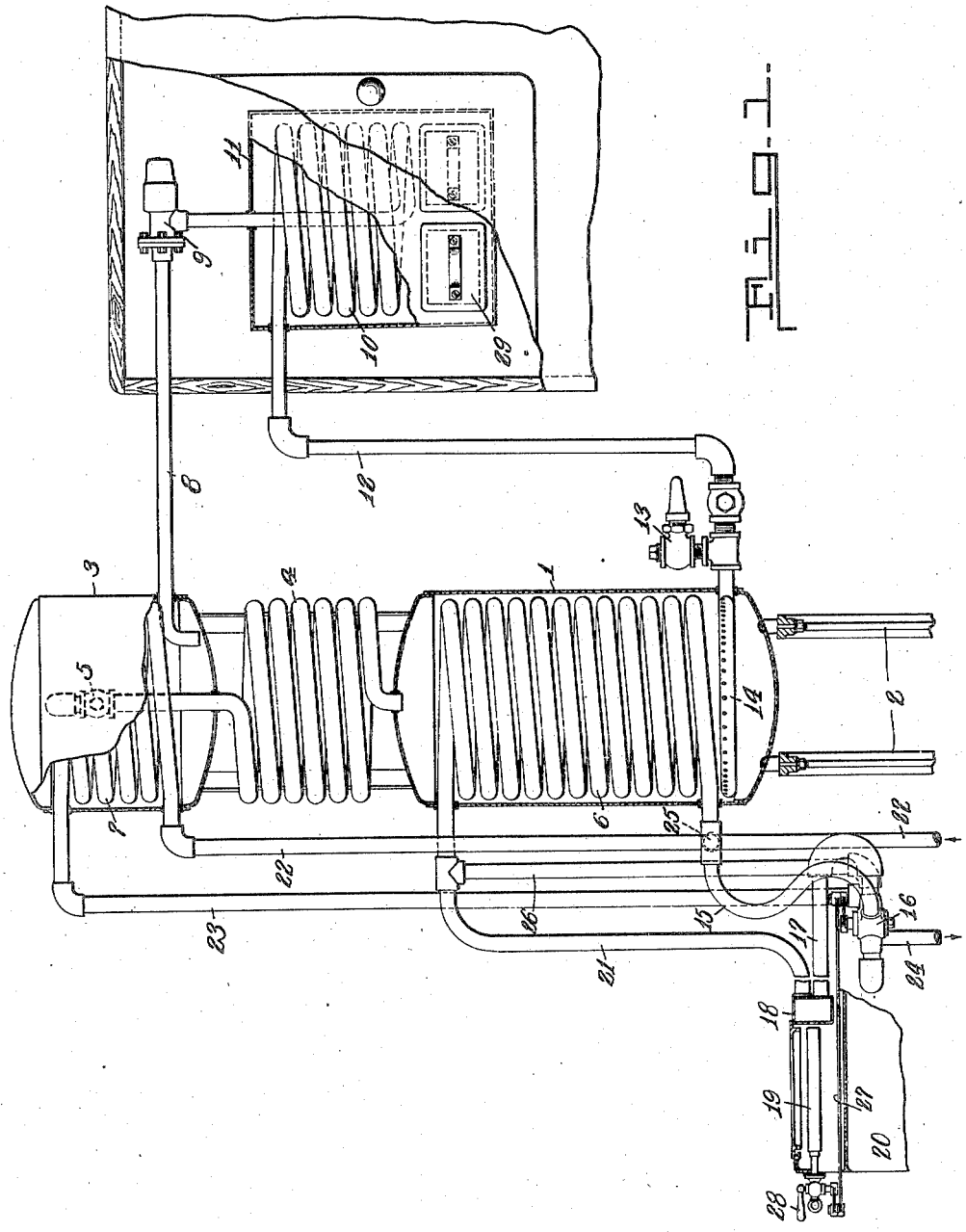
Inventor
NATHANIAL B. WALES.
By Attorney

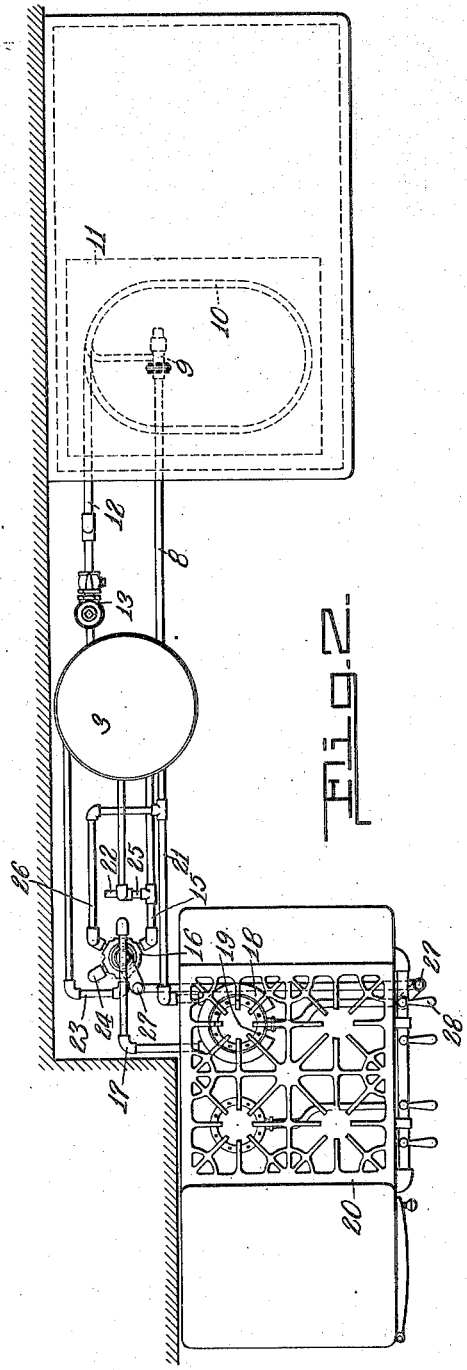

UNITED STATES PATENT OFFICE.

NATHANIEL B. WALES, OF DETROIT, MICHIGAN, ASSIGNOR TO KELVINATOR COMPANY, OF DETROIT, MICHIGAN, A CORPORATION OF MICHIGAN.

REFRIGERATING APPARATUS.

1,325,868.  Specification of Letters Patent.  Patented Dec. 23, 1919.

Application filed April 20, 1917. Serial No. 163,334.

*To all whom it may concern:*

Be it known that I, NATHANIEL B. WALES, a citizen of the United States, residing at Detroit, in the county of Wayne and State of Michigan, have invented certain new and useful Improvements in Refrigerating Apparatus, of which the following is a full, clear, and exact description, such as will enable others skilled in the art to which it appertains to make and use the same.

This invention relates to refrigerating systems and apparatus.

One of the objects of the invention is to provide simple and efficient domestic refrigerating apparatus capable of economical operation.

A further object is to provide a reliable and safe apparatus of the character mentioned which may be cheaply manufactured and sold and which is capable of unit installation for ordinary household uses.

Other objects and advantages will be in part noted hereinafter in connection with the following description of the accompanying drawing which illustrates a typical embodiment of the invention, and in which—

Figure 1 is an elevational view partially in section;

Fig. 2 is a plan view of the apparatus;

Fig. 3 is a schematic view of a controlling valve thereof in one operative position; and Fig. 4 is a similar view of the latter in another operative position.

The invention deals, in general, with apparatus for effecting in cycles, distillation and absorption of ammonia gas, with a refrigerating utilization thereof during the absorption period.

Referring more particularly to the drawings, and first describing the structural features of the apparatus illustrated, there is shown in Fig. 1 a seamless or welded tank 1 mounted on a standard 2 and designed to contain ammonia hydrate of approximately 26° Baumé. Positioned thereabove and on the same supporting frame is a second tank 3 designed to receive and condense the ammonia gas. The two tanks or containers mentioned are connected by a dehydrating coil 4 which leads from the top of tank 1 to the upper interior of tank 3 and terminates in a check valve 5 operable to prevent back passage of the gas. Water pipe coils 6 and 7 are arranged within the tanks 1 and 3 respectively, for the functional purposes hereinafter set forth. The tanks 1 and 3 are also in communication through an ammonia conduit 8 which leads from the lower interior of the condensing tank through an automatic pressure actuated expansion valve 9 to a refrigerating coil 10 arranged within a brine tank 11, and thence by pipe 12 and check valve 13 to an apertured outlet ring 14 in the lower interior of the ammonia hydrate tank 1.

The coil 6 in tank 1 is connected through a pipe 15 to a master water controlling valve 16 and a pipe 17 with one or more fluid heating chambers 18, preferably in a semi-annular form and positioned about one or more of the burners 19 of a gas cook-stove 20 in such a manner as to take up surplus and reflected heat when the gas is burning and to permit easy removal of the burner, if desired. A return pipe 21 leading to the top of coil 6 permits the completion of a water heating circuit from the heater 18 to the coil 6, and controlled by the valve 16, as will appear. It will be understood also that other or special heating sources may be employed.

The coil 7 in tank 3 is connected on one side to water intake pipe 22 and on the other side through pipe 23 and valve 16 to the continuing water intake pipe 24 (or apparatus outlet pipe) for the house. This connection of the apparatus in the intake pipe of the general water supply from the mains is preferably such that all the water used in the house for any purpose passes through predetermined parts of the refrigerating apparatus, and its chill is utilized therein during such passage. Pipes 15 and 22 are also interconnected by a shunt pipe 25, and pipe 21 is further connected by pipe 26 and valve 16 with the apparatus outlet pipe 24.

The master valve 16 is preferably controlled through a lever and link connection 27, directly by the gas cock 28 of burner 19 around which is positioned the heating chamber 18. The construction is such that when the gas valve is closed, the fluid valve 16 establishes one circuit for the intake water, and when the gas valve is open the fluid valve establishes a second circuit for the intake water, as will be described more particularly.

The apparatus when installed is supplied with ammonia hydrate in the container 1 and with brine solution in the refrigerating tank 11. At the time of installation the air is initially removed from the ammonia circuit. Thereafter, as above indicated, the cycle of operation comprises a period of distillation of ammonia from the hydrate (while the gas burner 19 is in operation) and a period of refrigerating ammonia reabsorption (when the gas valve is closed). Assuming the former condition the operation is as follows: Master valve 16 is positioned as shown in Fig. 4 and thereby a water circuit is established through and between coil 6 and heater 18. As water is heated in the latter it circulates by rising in the pipe 21, descending through coil 6 and returning through pipe 15, valve 16, and pipe 17 to the heating chamber. At the same time the water heating circuit mentioned is in communication through shunt pipe 25 with the water main pressure in pipe 22 so that fluid expansion and replenishment is provided for. Due to the heating effect of coil 6 immersed in the ammonia hydrate, the ammonia of the latter is driven out of solution and passes upward as a gas through coil 4 (in which any water entrained in the ammonia is condensed and drips back into the container) check valve 5 and into the upper tank 3 where it is then or later liquefied by the cooling effect of coil 7 through which water may be flowing for other household purposes. The fluid circuit last mentioned is through intake pipe 22, coil 7, pipe 23, valve 16, and pipe 24. This period in the operation continues during the heating of water in the chamber 18 surrounding the gas burner, or until the pressure is stabilized in the containers 1 and 3.

When the gas is turned off and the master valve therefore assumes the position indicated in Fig. 3, the second period of the operation occurs. At this time the heating circuit between the coil 6 and the heater 18, and the cooling circuit including coil 7, are closed, and another cooling circuit is established through intake pipe 22, shunt pipe 25, upwardly through coil 6 to pipe 26, and through valve 16 to the apparatus outlet pipe 24. In this manner relatively cold water may pass through the coil 6 in the reverse direction to the flow of heated water which passed therethrough during the previous cycle. The liquid in the tank 6 is thereby cooled with a lowering of pressure in said tank. As a consequence the liquid ammonia in the upper tank (still under pressure) passes through pipe 8 and expansion valve 9 into refrigerating coil 10 where the liquid ammonia changes to a gaseous condition by a proper expansion and thereby produces a refrigerating effect in the brine tank 11 in which the expansion coil is immersed. From coil 10 the gas continues through check valve 13 to the outlet 14 which is preferably apertured as shown to effect the emission of the gas from numerous jets and facilitates its absorption in the now cooled liquid of the container 1. This operation continues until the gas burner is again utilized and the distillation period begun, or until the pressure in the tanks 1 and 3 is stabilized. The periodic cycle of operations including the distinct intervals of distillation and absorption will recur under normal conditions of domestic routine with sufficient frequency to effect and maintain for continued periods a refrigerating temperature in the brine tank 11 which temperature may be utilized, for example, to freeze water cubes in trays 29 positioned in suitable refrigerating compartments.

It is to be noted that the apparatus as above described comprises relatively few parts capable of easy assembly and cheap manufacture. It may be shipped and installed as a unit. It is substantially automatic in operation and requires a minimum of attention. Furthermore it is thoroughly safe and efficient, as the ammonia hydrate container is not subjected to direct heating, but is warmed only through the intermediate water circuit coil 6 and heating chamber 18. As previously described, moreover, the entire system utilizes to a large extent only the surplus or rejected heat of the gas stove and the naturally available chill of the water from the city main passing into the house for usual purposes. The whole equipment therefore is operable at a minimum expense and does not constitute a wasteful drain on the main water supply.

Having described my invention, what I desire to secure by Letters Patent is:

1. In refrigerating apparatus of the character described, in combination, a water intake circuit including a coil; a second water intake circuit including a coil; an ammonia hydrate container about said second coil; an ammonia container about said first coil; a conduit connecting said containers; a water heating circuit including said second coil and a spaced heating chamber; a master controlling valve for said circuits adapted to establish said first mentioned intake circuit and said heating circuit in one position, and said second mentioned intake circuit in another position; and an ammonia expansion circuit connecting said containers and including a refrigerating coil.

2. In refrigerating apparatus for the purpose set forth, in combination, a water intake circuit including a coil; a second water intake circuit including a coil; an ammonia hydrate container about said second coil; an ammonia container about said first coil; a conduit connecting said containers; a water heating circuit including said second coil and a spaced heating chamber; a controlling valve for said circuits adapted to establish said first mentioned intake circuit and said heating circuit in one position, and said second mentioned intake circuit in another position; an ammonia expansion circuit connecting said containers and including a refrigerating coil; said expansion circuit also including an automatic pressure valve to control the admission of ammonia to said refrigerating coil, and a check valve to prevent passage of liquid from said first mentioned container to said expansion circuit.

3. In refrigerating apparatus, in combination, a water intake circuit including a coil; a second water intake circuit including a coil; an ammonia hydrate container about said second coil; an ammonia container about said first coil; a conduit connecting said containers and including a check valve to prevent reverse passage of ammonia from said second mentioned container to said first mentioned container; a water heating circuit including said second coil and a spaced heating chamber; a controlling valve for said circuits adapted to establish said first mentioned intake circuit and said heating circuit in one position, and said second mentioned intake circuit in another position; an ammonia expansion circuit connecting said containers and including a refrigerating coil; said expansion circuit also including an automatic pressure valve to control the admission of ammonia to said refrigerating coil, and a check valve to prevent passage of liquid from said first mentioned container to said expansion circuit.

4. In refrigerating apparatus, in combination, an ammonia hydrate container; an ammonia receiving- and condensing-container; a conduit connecting said containers and including a dehydrating coil and means to prevent reverse passage from said ammonia container to said hydrate container; an ammonia expansion conduit connecting said containers and including a pressure actuated valve to control the passage of ammonia therethrough and a check valve to prevent reverse passage therethrough of liquid from said hydrate container; a water conduit in said hydrate container; a water conduit in said ammonia container; a water heating chamber; pipe connections between said water conduits and an intake water supply; and controlling means operable to selectively establish a water intake circuit through said conduit in said hydrate container, and a water intake circuit through said conduit in said ammonia container and a water heating circuit through said heating chamber and said conduit in said hydrate container.

5. In refrigerating apparatus, in combination; a water intake circuit; a coil adapted to be included in said circuit; a second coil adapted to be included in said circuit; an ammonia hydrate container about said first coil; an ammonia container about said second coil; a dehydrating conduit connecting said containers and including means to prevent reverse passage from said ammonia container to said hydrate container; a water heating circuit including a heating chamber and said first coil; said heating circuit communicating with said intake circuit; a gas burner; a controlling valve therefor; a controlling valve for said water circuits operable by said gas controlling valve when open to establish said heating circuit and said intake circuit including said second coil, and when closed to establish said intake circuit including said first coil; and an ammonia expansion circuit connecting said containers and including a refrigerating coil and a check valve to prevent the passage of the liquid from said hydrate container to said expansion circuit.

6. In refrigerating apparatus, in combination, a water intake circuit; a coil adapted to be included in said circuit; a second coil adapted to be included in said circuit; an ammonia hydrate container about said first coil; an ammonia container about said second coil; a dehydrating conduit connecting said containers and including means to prevent reverse passage from said ammonia container to said hydrate container; a water heating circuit including a heating chamber and said first coil; said heating circuit communicating with said intake circuit; a gas burner; a controlling valve therefor; a controlling valve for said water circuits operable by said gas controlling valve when open to establish said heating circuit and said intake circuit including said second coil, and when closed to establish said intake circuit including said first coil; and an ammonia expansion circuit connecting said containers and including a refrigerating coil; said expansion circuit also including an automatic pressure expansion valve to control the admission of ammonia to said refrigerating coil, and a check valve to prevent the passage of the liquid from said hydrate container to said expansion circuit.

7. In refrigerating apparatus, in combination, a water intake circuit; a coil adapted to be included in said circuit; a second coil adapted to be alternatively included in said circuit; an ammonia hydrate container about said first coil; an ammonia container about said second coil; a dehydrating conduit connecting said containers and including means to prevent reverse passage from said ammonia container to said hydrate container; a water heating circuit to include a heating chamber and said first coil; said heating circuit communicating with said intake circuit; a gas burner; a controlling valve therefor; a controlling valve for said water circuits operable by said gas controlling valve when open to establish said heating circuit and said intake circuit including said first coil, and when closed to establish said intake circuit including said second coil; an ammonia expansion circuit connecting said containers and including a refrigerating coil; said expansion circuit also including an automatic pressure expansion valve to control the admission of ammonia to said refrigerating coil, and a check valve to prevent the passage of liquid from said hydrate container to said expansion circuit; and a brine tank about said refrigerating coil.

8. In refrigerating apparatus, in combination, a water intake circuit including a coil; a second water intake circuit including a coil; an ammonia hydrate container about said second coil; an ammonia container about said first coil; a conduit connecting said containers and including a check valve to prevent reverse passage of ammonia from said second container to said first container; a water heating circuit including said second coil and a heating chamber; said water heating circuit communicating with said first intake circuit; a controlling valve for said circuits adapted to establish said first intake circuit and said heating circuit in one position, and said second mentioned intake circuit in another position; and an ammonia expansion circuit connecting said containers and including a refrigerating coil.

9. In refrigerating apparatus, in combination, an ammonia hydrate container, an ammonia container, a conduit between said containers to permit passage of ammonia therethrough from said hydrate container to said ammonia container only, means including a water heating circuit to effect distillation of the ammonia from said hydrate container to said ammonia container; means including a water intake circuit to effect condensation of ammonia in said ammonia container; means including a water intake circuit to effect cooling of the liquid in said hydrate container; a master controlling valve to selectively establish the heating circuit and the condensation circuit, and the cooling circuit; and a refrigerating circuit automatically acting in accordance with the circuits established by said valve to periodically permit expansive passage of ammonia from said ammonia container to said hydrate container.

10. In refrigerating apparatus, in combination, an ammonia hydrate container; an ammonia container; a conduit between said containers to permit passage of ammonia therethrough from said hydrate container to said ammonia container only; a burner; a valve therefor, means including a water heating circuit to effect distillation of the ammonia from said hydrate container to said ammonia container; means including a water intake circuit to effect condensation of ammonia in said ammonia container; means including a water intake circuit to effect cooling of the liquid in said hydrate container; said water heating circuit communicating with one of said water intake circuits; a master controlling valve automatically operable by said burner valve to selectively establish said heating circuit and said condensation circuit, and said cooling circuit; and a refrigerating circuit automatically acting in accordance with the circuits established by said valve to periodically permit expansive passage of ammonia from said ammonia container to said hydrate container.

11. In a system of the character described, in combination, refrigerating apparatus including two coils adapted for passage of cool water, a conduit in constant communication with both of said coils, and a master valve having a discharge opening and adapted to effect communication between either of said coils selectively and said discharge opening, said conduit and said opening being adapted for connection in an intake water supply line whereby such intake water traverses one or the other of said coils.

12. In a system of the character described, in combination, a coil adapted for cool water circulation, a second coil adapted for heated water circulation and for cool water circulation, an intake conduit for water under pressure in constant communication with said second coil, and a valve having a discharge opening and having means to permit water circulation in the said first coil only during heated water circulation in said second coil and to prevent circulation in said first coil during cool water circulation in said second coil.

13. In a system of the character described, in combination, a coil adapted for cool water circulation, a second coil adapted for heated water circulation and for cool water circulation, an intake conduit for water under pressure in constant communication with both of said coils, means to heat water for circulation in said second coil, and a valve having a discharge opening and having means to permit water circulation in said first coil and heated water circulation in said second coil in one condition, and cool water circulation in said second coil only in another condition.

In testimony whereof I affix my signature, in the presence of two witnesses.

NATHANIEL B. WALES.

Witnesses:
H. WATSON,
C. J. KULBERG.